US012650213B2

(12) United States Patent
Sindhe

(10) Patent No.: US 12,650,213 B2
(45) Date of Patent: Jun. 9, 2026

(54) LIGHT PATTERN GENERATOR, ILLUMINATION DEVICE, VEHICLE AND METHOD FOR CONTROLLING SUCH AN ILLUMINATION DEVICE

(71) Applicant: MERCEDES-BENZ GROUP AG, Stuttgart (DE)

(72) Inventor: Vinay Sindhe, Bangalore (IN)

(73) Assignee: MERCEDES-BENZ GROUP AG, Stuttgart (DE)

( * ) Notice: Subject to any disclaimer, the term of this patent is extended or adjusted under 35 U.S.C. 154(b) by 34 days.

(21) Appl. No.: 18/872,429

(22) PCT Filed: Apr. 18, 2023

(86) PCT No.: PCT/EP2023/060023
§ 371 (c)(1),
(2) Date: Dec. 6, 2024

(87) PCT Pub. No.: WO2023/237250
PCT Pub. Date: Dec. 14, 2023

(65) Prior Publication Data

US 2026/0139808 A1 May 21, 2026

(30) Foreign Application Priority Data

Jun. 8, 2022 (DE) ..................... 10 2022 001 991.4

(51) Int. Cl.
*F21S 41/675* (2018.01)
*F21S 41/16* (2018.01)

(52) U.S. Cl.
CPC ............. *F21S 41/675* (2018.01); *F21S 41/16* (2018.01)

(58) Field of Classification Search
CPC .. H04N 9/3161; H04N 9/3182; H04N 9/3129; F21V 14/04; F21S 10/063;
(Continued)

(56) References Cited

U.S. PATENT DOCUMENTS 3,998,092 A 12/1976 Maccabee
5,864,417 A 1/1999 Ho
(Continued)

FOREIGN PATENT DOCUMENTS

DE 4406339 A1 8/1995
DE 102009058762 A1 6/2011
(Continued)

OTHER PUBLICATIONS

International Search Report and Written Opinion mailed Aug. 8, 2023 in related/corresponding International Application No. PCT/EP2023/060023.
(Continued)

*Primary Examiner* — Anabel Ton
(74) *Attorney, Agent, or Firm* — PATENT PORTFOLIO BUILDERS PLLC

(57) ABSTRACT

A light pattern generator includes a laser generator, a screen partially transparent to the laser beam, a moveable mirror arranged in the beam path, an actuator for actuating the mirror, and a control device for controlling the respective actuator. The control device, actuator, mirror are configured to deflect the laser beam onto the screen in such a way that the laser beam is guided continuously along an inherently closed path on the screen, such that the laser beam generates a node pattern on the screen. The control device controls the actuator by a control signal with a characteristic frequency, control signals differing by at least different characteristic frequencies are held in the control device or can be generated by the control device, and a respective control signal for controlling the actuator can be selected by the control device depending on a selection variable.

12 Claims, 5 Drawing Sheets

Figure 1:
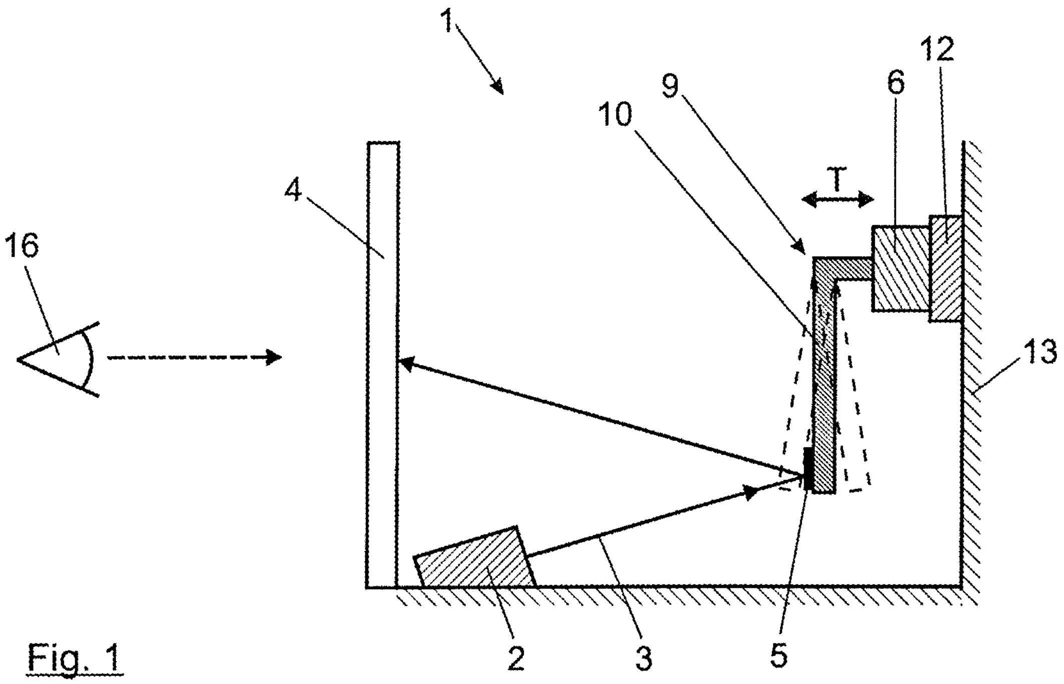

(58) Field of Classification Search
CPC .... F21S 41/16; F21S 41/675; G03B 21/2053; G03B 21/2033; G02B 26/10
See application file for complete search history.

(56) References Cited

U.S. PATENT DOCUMENTS

| | | | | |
|---|---|---|---|---|
| 5,988,508 | A | 11/1999 | Bridgelall et al. | |
| 9,151,949 | B2 | 10/2015 | Hofmann et al. | |
| 10,914,442 | B2 * | 2/2021 | Mouri | F21S 41/141 |
| 2009/0185251 | A1 | 7/2009 | Chen et al. | |
| 2011/0149268 | A1 | 6/2011 | Marchant et al. | |
| 2015/0016135 | A1 | 1/2015 | Erdl et al. | |
| 2016/0073000 | A1 | 3/2016 | Abelé et al. | |
| 2017/0106793 | A1 | 4/2017 | Kumar et al. | |
| 2018/0156409 | A1 | 6/2018 | Schwaiger | |

FOREIGN PATENT DOCUMENTS

| | | | | |
|---|---|---|---|---|
| DE | 102015013462 | A1 | 4/2017 | |
| DE | 102016208959 | A1 | 11/2017 | |
| DE | 102020213059 | A1 | 4/2022 | |
| EP | 0323026 | A2 | 7/1989 | |
| EP | 4167016 | A1 * | 4/2023 | G02B 26/105 |
| GB | 2135536 | A | 8/1984 | |
| JP | 2017538301 | A | 12/2017 | |
| WO | 2007105678 | A1 | 9/2007 | |
| WO | 2019230664 | A1 | 12/2019 | |

OTHER PUBLICATIONS

Office Action created Nov. 9, 2022 in related/corresponding DE Application No. 10 2022 001 991.4.
Office Action dated Oct. 21, 2025 in related/corresponding JP Application No. 2024-570943.

* cited by examiner

LIGHT PATTERN GENERATOR, ILLUMINATION DEVICE, VEHICLE AND METHOD FOR CONTROLLING SUCH AN ILLUMINATION DEVICE

BACKGROUND AND SUMMARY OF THE INVENTION

Exemplary embodiments of the invention relate to a light pattern generator, an illumination device having such a light pattern generator, a vehicle having such an illumination device and a method for controlling the illumination device.

Illumination devices play an important role in the aesthetics and safety of vehicles. Thanks to daytime running lights and switched-on rear lights, vehicles can be better recognized not only in the dark or in poor visibility conditions, e.g., fog or heavy rain, but also during the day. By means of an additional brake light and as a result of the extra bright illumination of the rear lights, a vehicle can communicate to other road users that it is braking. A direction indicator, such as an indicator light, can be used to indicate a lane change or issue a warning. The special design of lighting elements can also be used to set accents in the aesthetics and characteristic appearance of vehicles.

Here, a conventional taillight such as a combination rear light or brake light is only capable of implementing continuous illumination, possibly with different brightness levels. The possibilities for signaling various events or providing functionalities are therefore very limited. Additionally, a lighting device that is continuously operated with the same brightness is not an "eye-catcher".

In prototype construction, the replacement of conventional rear lights with a pixel light designed like a display is well known. The company Audi, for example, has presented the OLED display known as the "Swarm Matrix". This is a comparatively large OLED display on which red or orange light dots are depicted moving like a swarm of insects. The light patterns displayed in this way are animated, whereby information can be conveyed by displaying different light patterns as additional functionality. In addition, customers may be enthralled by this novelty. However, due to the use of OLEDs, a corresponding display is comparatively expensive. In addition, OLEDs age comparatively quickly, which leads to a limited service life.

A device and a method for projecting a light pattern are known from DE 10 2016 208 959 A1. The device comprises a laser device that is able to generate white laser light by combining a red, green and blue laser. A corresponding laser beam is moved by means of a deflection device to "scan" a two-dimensional field. In doing so, various illumination devices for vehicles can be realized, such as a matrix headlight or a rear light. However, the disadvantage here is the effort required to control the deflection device and the laser device in order to guide the laser according to the two-dimensional grid. The corresponding hardware components must be designed to move the laser beam to generate a pixel light, which requires a complex structure and thus drives up the manufacturing costs of the device.

Furthermore, DE 10 2015 013 462 A1 discloses a lighting element on a vehicle and a vehicle with a corresponding lighting element. A light intensity, light color, light frequency, and/or a light pattern displayed by means of the lighting element is here changed depending on at least one vehicle parameter. In doing so, new functionalities can be provided, such as illumination that is dependent on the forward moving speed, engine power, time of day, ambient brightness, or other factors. A person driving the vehicle can here use the lighting element to select preferred patterns to be displayed from a catalogue of predefined patterns. The lighting element comprises one or more LEDs as the light source, which limits the possibilities for displaying complex light patterns.

Furthermore, GB 2 135 536 A discloses a noise-sensitive illumination system and a device having such an illumination system.

In addition, DE 10 2020 213 059 A1 discloses a method for surroundings detection, a detection device, and a motor vehicle. The detection device has a laser headlight, which in turn comprises a laser light source and a mirror arranged in the beam path of the laser. The mirror can be swiveled independently of each other around two swivel axes that are perpendicular to each other. In doing so, it is possible to generate Lissajous patterns.

Furthermore, DE 44 06 339 A1 discloses an optical collision warning device for a vehicle. If a rear-end collision of the vehicle with the vehicle behind is imminent then rear lights in the vehicle, such as the brake lights, indicators or rear fog lights, can be activated in order to alert the driver of the vehicle behind to the imminent rear-end collision.

In addition, US 2009/0185251 A1 discloses an oscillating mirror for image projection. The mirror performs rotational oscillations around two mutually offset axes with two different rotational frequencies. In doing so, Lissajous patterns can be generated. The mirror can have a curved surface.

Furthermore, DE 10 2009 058 762 A1 discloses a deflection device for a projection device, a projection device for projecting an image, and a method for controlling the deflection device. Lissajous patterns can be generated by means of the projection device. The deflection device comprises a damped suspended deflection element.

Exemplary embodiments of the present invention are directed to an improved light pattern generator with which the generation of complex and dynamic light patterns is possible with a low control effort and which can be produced at low cost.

In a light pattern generator of the type mentioned at the start, comprising a laser generator for generating a laser beam, a screen that is at least partially transparent to the laser beam, at least one moveable mirror arranged in the beam path of the laser beam for deflecting the laser beam in the direction of the screen, a respective actuator for actuating the mirror, and a control device for controlling the respective actuator, the control device, the actuator, and the at least one mirror are set up to deflect the laser beam onto the screen in such a way that the laser beam can be continuously guided along an inherently closed track on the screen, such that the laser beam generates a node pattern on the screen, wherein the control device controls the actuator by means of at least one control signal with a characteristic frequency, control signals differing by at least different characteristic frequencies are held in the control device or can be generated by the control device and a respective control signal for controlling the actuator can be selected by the control device depending on a selection variable.

The light pattern generator according to the invention is constructed and designed in such a way that node patterns are generated on the screen by means of the laser beam. A node pattern is understood to be an inherently closed line with at least one intersection. Examples of node patterns are a line, a loop, a figure of eight, or the symbol for infinity. Here, the node pattern does not necessarily have to be symmetrical, but can also run chaotically. The node pattern can be static, i.e., retain its shape over time, or it can also be animated, i.e., thus move and/or change shape over time.

Such a node pattern can be generated with comparatively low construction and control effort, which keeps the production costs of the light pattern generator according to the invention low. Due to the special design of node patterns, in particular animated and/or moving node patterns, these are particularly easy for a person to recognize, which leads to improved perception by people. Depending on the selection variable and corresponding to the control signal designed depending on the different frequencies, different node patterns can be displayed by means of the light pattern generator, wherein the displayed node pattern is changed, in particular, for different application scenarios. In this way, the selection variable can be changed for different situations and the displayed node pattern can be varied accordingly. This makes it possible to provide a wide range of functionalities for reacting and adjusting the light pattern to specific situations, which will be discussed in more detail below in the context of a vehicle.

The control unit is designed on the hardware and/or software side in such a way that the actuator and the at least one mirror are controlled to generate the node patterns on the screen. Corresponding control software can thus be held in the control device. A respective control signal can be designed particularly simply, for example as a sine or cosine oscillation, sawtooth pulse, rectangular pulse or similar. A respective signal here has an individual characteristic frequency. This frequency can be selected as required and can lie in the range of between 0.1 Hz and 10 kHz, for example. However, other frequencies are also possible. The actuator is then activated according to the control signal in order to excite or deflect the mirror to oscillate. Here, several control signals, each with different characteristic frequencies, can also be superimposed. For example, a first control signal with a characteristic frequency of 1 Hz can be superimposed with a second control signal with a characteristic frequency of 5 Hz and a third control signal with a characteristic frequency of 100 Hz. Corresponding control signals can also be modulated. In particular, individual control signals are respectively used for each degree of freedom of movement for several degrees of freedom of movement to move the mirror or mirrors by the actuator or actuators. For example, the mirror is moved by the actuator in an X-direction by means of a first control signal and in a Y-direction orthogonal to the X-direction by means of a second control signal.

The control device can also read an audio file, for example an MP3 file, a WAV file or similar, and derive the characteristic frequencies from the audio file for generating control signals. For example, for this an FFT analysis of the audio signal can be carried out. The audio file can also be used directly as a control signal.

By using control signals designed particularly simply and straightforwardly or the direct use of an audio file to control the respective actuator, the control effort required to generate the node patterns can be simplified.

The laser generator can be a laser diode, for example. This generates laser light with a comparatively narrow wavelength spectrum, in particular with a fixed wavelength. The laser beam can, for example, have a color that can be allocated to the visible spectrum, for example red, green or blue.

It can also be an infrared laser or preferably a UV laser. The screen can thus be coated with a fluorescent material and/or this material can be embedded in the screen. The fluorescent material is then excited to fluoresce by the UV laser, which allows the generation of particularly bright and colorful node patterns. An afterglow effect can be realized by integrating a material capable of phosphorescence. In particular, different materials capable of fluorescence can thus be applied in different localized regions of the screen. In this way, different colors can be generated by the same laser beam in different regions of the screen. As will still be shown below, the light pattern generator according to the invention can be integrated into a vehicle, for example. For example, such a material capable of fluorescence, which fluoresces yellow or orange, can be applied to the screen in the region of an indicator, and a material capable of fluorescence, which glows red when excited by the UV laser beam, can be applied in the region of a rear light and/or brake light. By using infrared or UV lasers the risk of living creatures being dazzled by the laser beam is minimized.

The seal does not necessarily have to be a physical mirror. A mirror is understood to be a surface or a surface portion that has sufficient reflectivity to deflect the laser beam in the direction of the screen, for example a metal sheet.

Here, the screen has sufficient transparency to allow light to pass through, such that the node pattern can be seen from the opposite side to where the laser beam hits. However, the transparency is here so low that a living being looking at the screen is not dazzled by the laser beam passing through the screen.

According to the invention, the actuator is set up to move the mirror or a holding element supporting the mirror in a translatory manner, wherein, in particular, the actuator is formed by a piezo element or a loudspeaker. This allows a particularly simple and cost-effective construction of the light pattern generator to be realized. The mirror can be attached directly to the actuator or also indirectly via a corresponding holding element. The actuator then causes the mirror to oscillate or deflect as a result of a translational deflection. A translational deflection can be carried out in one direction of movement or in two different directions of movement. An individual pair of mirror and actuator can also be provided for each direction of movement.

It is thus also generally possible to deflect the laser beam several times, for example two or three times, from the laser generator until it hits the transparent screen.

When using a loudspeaker as an actuator, the audio file in particular can preferably be used as the control signal. Thus, the audio signal can be applied directly to the loudspeaker as an input variable in order to stimulate it to vibrate.

An advantageous development of the light pattern generator provides that the mirror has a convex or concave curvature. By providing a curved mirror, the angle at which the mirror deflects the laser beam can be varied depending on the degree of deflection. Thus, the forward movement speed of the laser beam on the screen changes continuously during the generation of the node pattern. This creates a special lighting effect. Thus, even more complex node patterns can be created, in particular with a different perceived brightness in different sections, since sections of the node pattern along which the laser beam moves more quickly appear darker to an observer.

A further advantageous design of the light pattern generator further provides that the mirror is attached to the actuator via a holding element in the form of a lever arm extending away from the actuator substantially orthogonally from a direction of translation of the actuator. By designing the retaining element as a lever arm, the degree of deflection of the mirror can be increased during translation of the actuator. In doing so, the lever arm acts as a deflection amplifier. Due to the rigidity of the lever arm, it has a characteristic separate frequency, which allows the mirror to be excited to oscillate with corresponding characteristic oscillation modes. Depending on the design of the lever arm, the shape of the node patterns that can be generated on the screen can be changed.

Due to the amplifying effect of the lever arm on the deflection of the mirror, the amplitude can be reduced when the actuator is deflected. This saves energy and/or reduces noise pollution when using a loudspeaker as an actuator.

According to a further advantageous design of the light pattern generator, the lever arm has different bending stiffnesses in its main direction of expansion and a direction transverse to this. When the lever arm is excited to oscillate by the actuator, this is not only excited to bending vibration along its main direction of expansion, but also transversely to it, depending on the design. In particular with different bending stiffnesses in the corresponding directions, a translational deflection of the actuator in only one direction enables a deflection of the mirror in at least two different directions, whereby node patterns can be generated in a particularly simple manner. To influence the bending stiffness of the lever arm, it can have a special shape and/or comprise different material at different points. The E module of a material thus also has an effect on the bending stiffness.

The actuator is preferably attached to a higher-level structure via a damping element. The hardware components of the light pattern generator can, for example, be surrounded by a housing. Here, the screen can form a section of the housing or be integrated into the housing. Since the actuator is excited to make movements, in particular harmonic oscillations, the actuator can form a noise source. The actuator can thus also cause the housing to vibrate, which can lead to disturbing noises. However, such cases can be avoided by attaching the actuator to the higher-level structure via a damping element. Any material, for example, such as polystyrene, a hardened plastic foam, rubber, cardboard, an elastomer, or similar can be used to form the damping element. The damping element can be designed passively or actively. The damping element can thus also comprise or represent an active vibration absorber. When the actuator is designed as a loudspeaker, an active damping element provides the option of active noise cancelling.

Corresponding to an alternative design of the light pattern generator according to the invention, the actuator is set up to rotationally move the mirror or a holding element supporting the mirror, wherein the mirror is attached to the actuator in such a way that it is inclined at an angle relative to its axis of rotation. According to the invention, at least two rotationally moved mirrors arranged in the beam path of the laser beam are here arranged and aligned in relation to each other in such a way that the laser beam is moved along a Lissajou pattern when the mirrors rotate on the screen.

By rotating a mirror, the laser beam is guided along a path as the mirror rotates. This enables the use of electric motors as actuators, for example, which are also inexpensive and readily available. If the light pattern generator comprises several mirrors and several actuators, one mirror can also be deflected translationally and one rotationally. Combinations are therefore possible.

A Lissajou pattern is a special form of node pattern. These are symmetrical and thus have a particularly high aesthetic appeal. A Lissajou pattern is also known as a Lissajou figure. As already mentioned, a corresponding Lissajou pattern can be static or can move. In particular, a particularly aesthetic and easily recognizable light pattern is generated by a moving Lissajou pattern on the screen.

An illumination device according to the invention comprises at least one light pattern generator as described above. Here, the individual light pattern generators can have laser generators, each of which generates a laser beam with a different color. The two laser beams can then be projected onto a common screen. This allows different colored node patterns to be generated in different spatial regions of the screen. Here, the node patterns can also overlap at least partially.

According to the invention, a vehicle comprises such an illumination device. In particular, the illumination device is here designed as a rear light. Preferably, one illumination device is provided in each case to form an indicator, a rear light, a brake light, a headlight, a radiator grille light, or similar. It is also possible to integrate several vehicle lights, such as an indicator and a rear light, into a common illumination device. This connection has already been described above. When the illumination device according to the invention is used as an indicator, the displayed node pattern can be changed, in particular, with each newly displayed indicating signal. This produces a flashing signal that is particularly easy to perceive. The shape of the node pattern can also be changed when, for example, the left indicator is flashing, the right indicator is flashing or the vehicle's hazard warning lights are activated. Here, the control device of the light pattern generator can be formed by or integrated into a computing unit of the vehicle.

In a method for controlling an illumination device included in a vehicle described above, the selection variable is determined, according to the invention, by a computing unit of the vehicle depending on a vehicle parameter, a distance measured by the vehicle to another vehicle following the vehicle, and/or an operating action input via a human-machine interface. By changing the selection variable depending on the variables, different functions can be provided. The vehicle parameter can be the use of a certain type of drive, i.e., for example, the use of an internal combustion engine or an electric motor, a forward movement speed of the vehicle, an actuation of the accelerator pedal, i.e. performing an acceleration, an actuation of the brake, and/or operating the vehicle in a comfort, sport, or dynamic driving mode.

For example, the forward moving speed of the vehicle can be continuously divided into 10 km/h increments, and the selection variable is changed for each speed section, whereby a new control signal with a different characteristic frequency is output by the control device to control the actuator. Here, such control signals are preferably used by changing the selection variable to control the actuator, such that the node pattern displayed via the illumination device appears more dramatic as the speed of travel increases. In this context, more dramatic means, in particular, that the size of the node pattern increases, the luminosity increases, the movement speed increases, more nodes are included in the node pattern and/or the node pattern flashes.

Analogously, the node pattern appears more dramatic when the vehicle carries out a braking maneuver. This can make other vehicles following the vehicle aware of the braking maneuver, similar to an additional brake light.

Preferably, the vehicle measures a distance to the corresponding following vehicle and adjusts the node pattern depending on the measured distance. In doing so, a collision warning is issued to the vehicle following the vehicle. For example, the vehicle can thus display a certain node pattern while driving, which is changed when the brake is applied. If the other vehicle approaches, the node pattern is changed further until it is displayed in its most dramatic form, for example when the distance falls below a critical level, i.e., for example particularly large, brightly lit, comprising many nodes and flashing. This improves road traffic safety, since the person driving the other vehicle is made aware of an impending rear-end collision and is thus instructed to carry out a particularly strong emergency braking maneuver.

Here, it is possible for a user of the vehicle, such as the person driving the vehicle, to be able to set via the human-machine interface, for example a touch-sensitive display, a preference for which node pattern is to be displayed on the lighting device for which scenario or boundary condition. Here, the user of the vehicle can also set which node pattern is to be used for which situation, even if the node pattern is automatically displayed differently depending on the situation. Preferably, the user of the vehicle can also make this setting while driving the vehicle. A mobile terminal coupled to the vehicle can also be used as the human-machine interface. Correspondingly, an app suitable for setting the selection variable is run on the mobile terminal, for example a smartphone.

Preferably, the control signal selected by the control device depending on the selection variable is output visually and/or acoustically in the vehicle and/or the contour pattern that can be generated on the screen depending on the respective control signal is output visually in the vehicle.

In doing so, a variety of options are provided in order to show the user how the node pattern is displayed via the illumination device. A visual display of the control signal and/or the node pattern can here be carried out via any display device in the vehicle or on the mobile terminal of the vehicle user. An acoustic output of the control signal, in particular the audio file, can be carried out via a sound system of the vehicle or a loudspeaker of the mobile terminal. In particular when the control signal and the node pattern are displayed simultaneously, the user is able to perceive the influence of the control signal on the node pattern that can be generated.

Further advantageous embodiments of the light pattern generator according to the invention, the illumination device according to the invention, the vehicle according to the invention and the method for controlling an illumination device comprised by such a vehicle also emerge from the exemplary embodiments, which are described in more detail below with reference to the figures.

BRIEF DESCRIPTION OF THE DRAWING FIGURES

Figure 2:
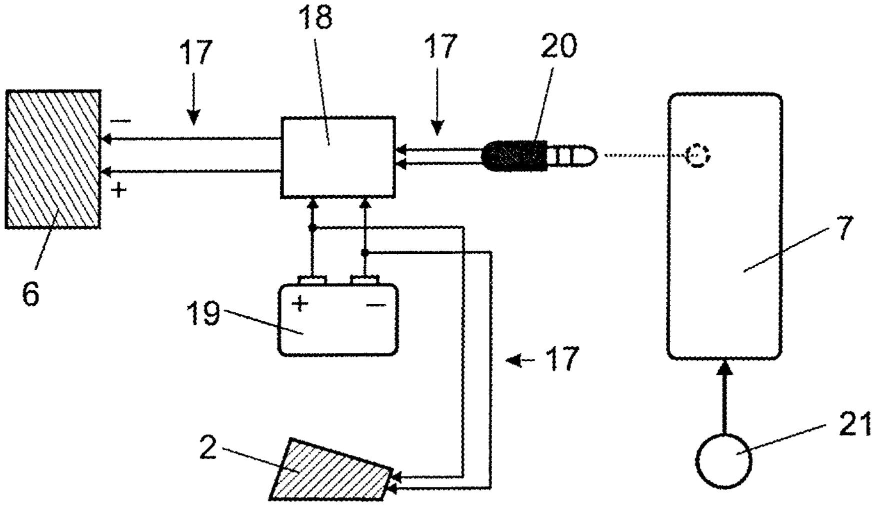
Figure 3:
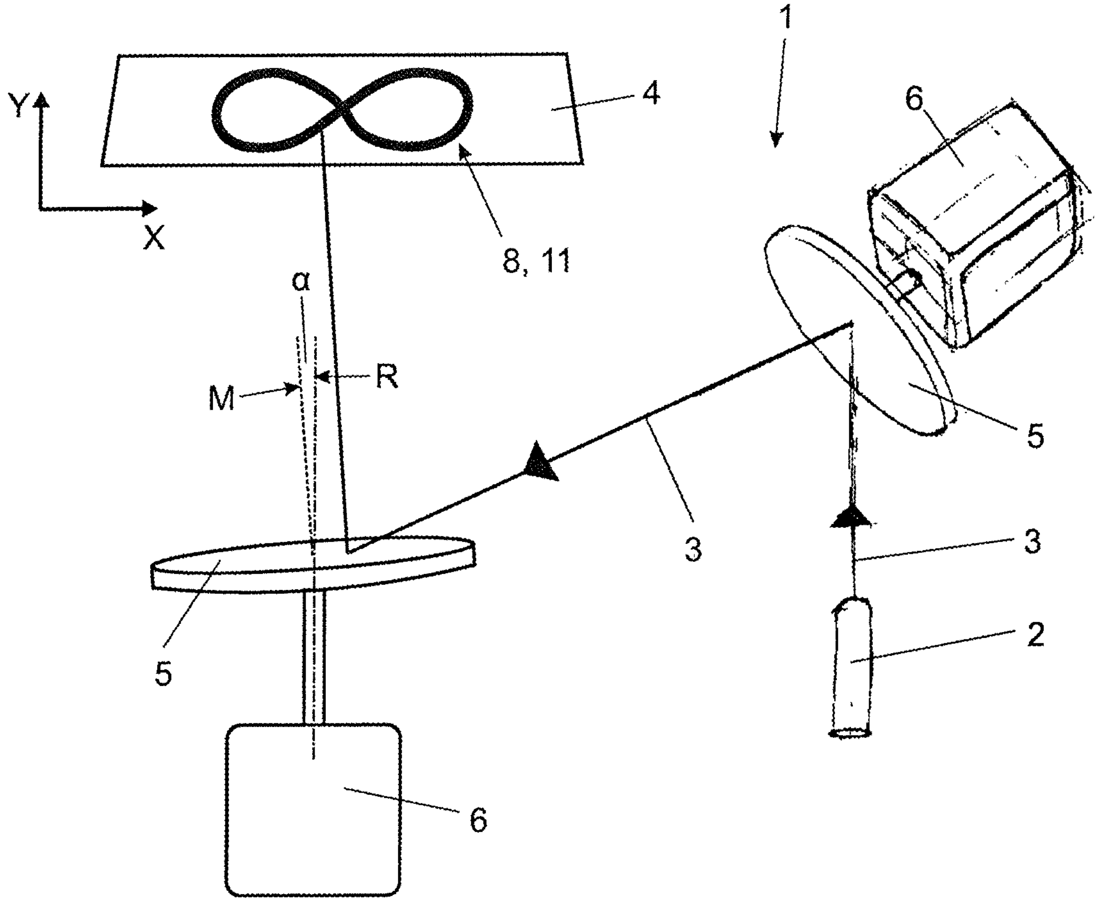
Figure 4:
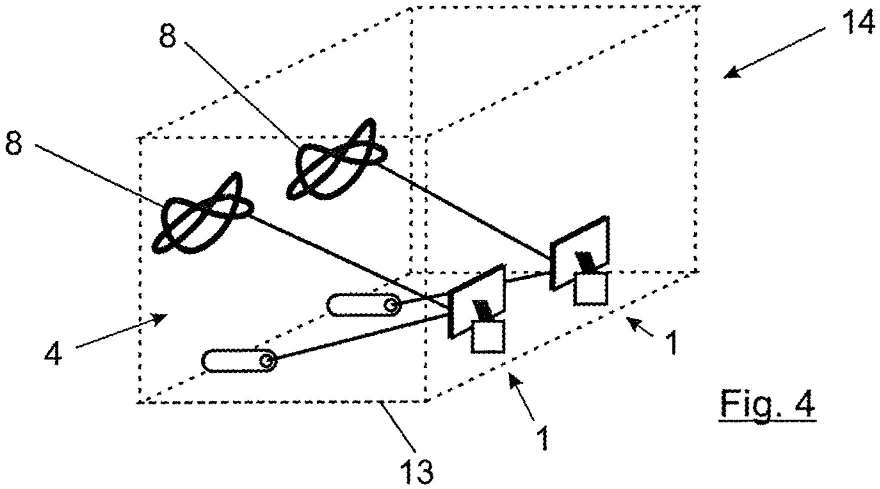
Figure 5:
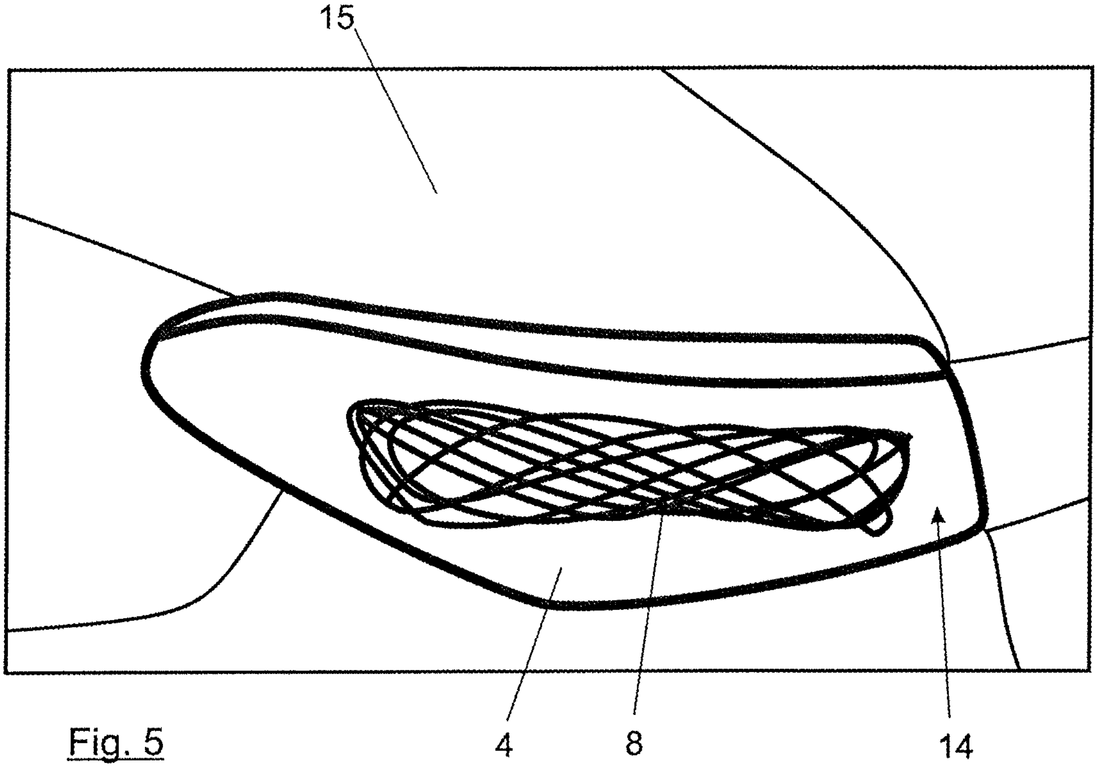
Figure 6:
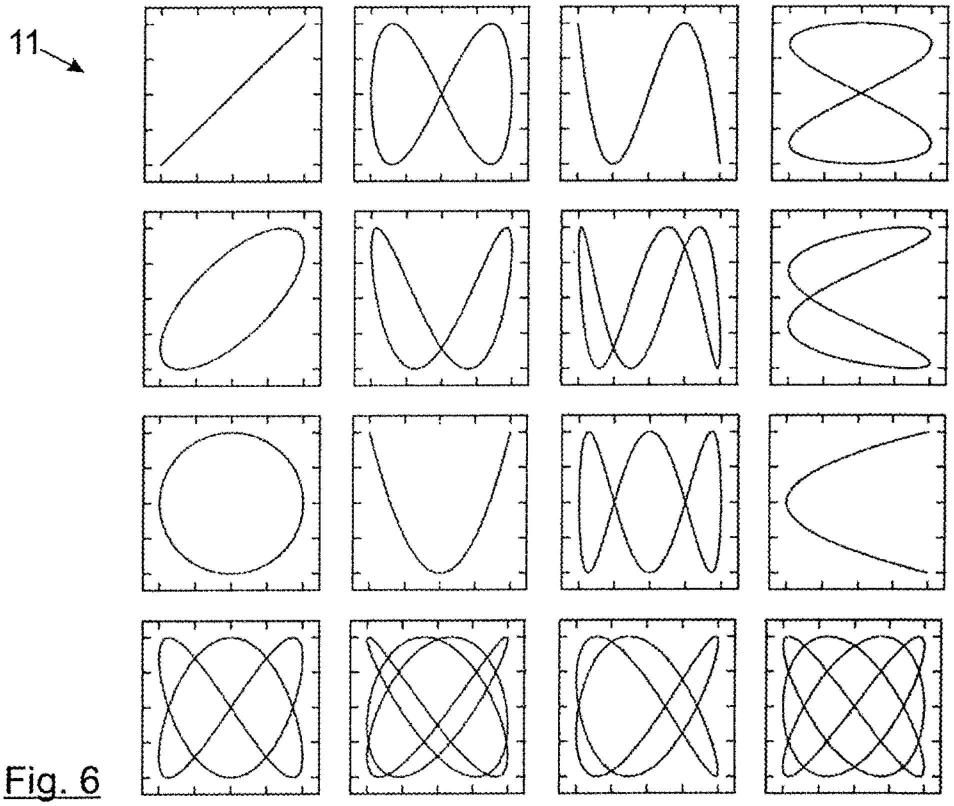
Figure 7:
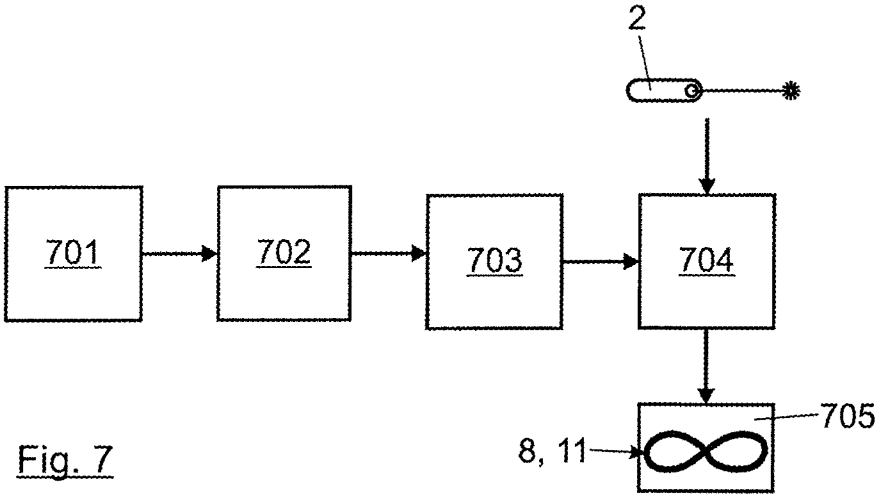
Figure 8:
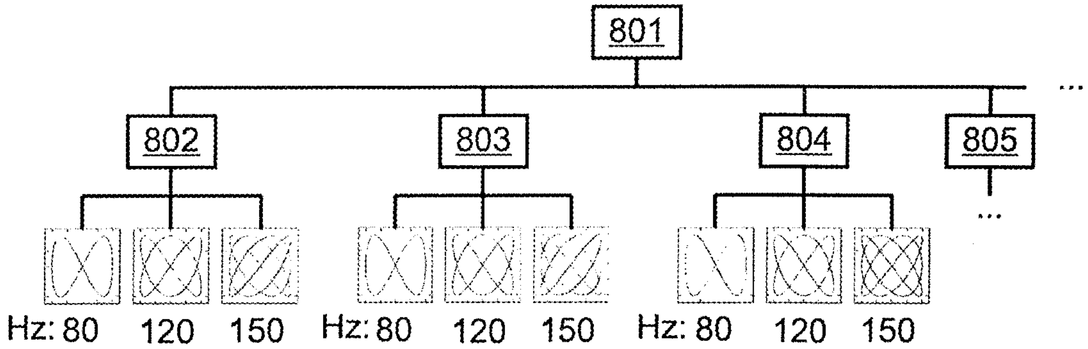
Figure 9:
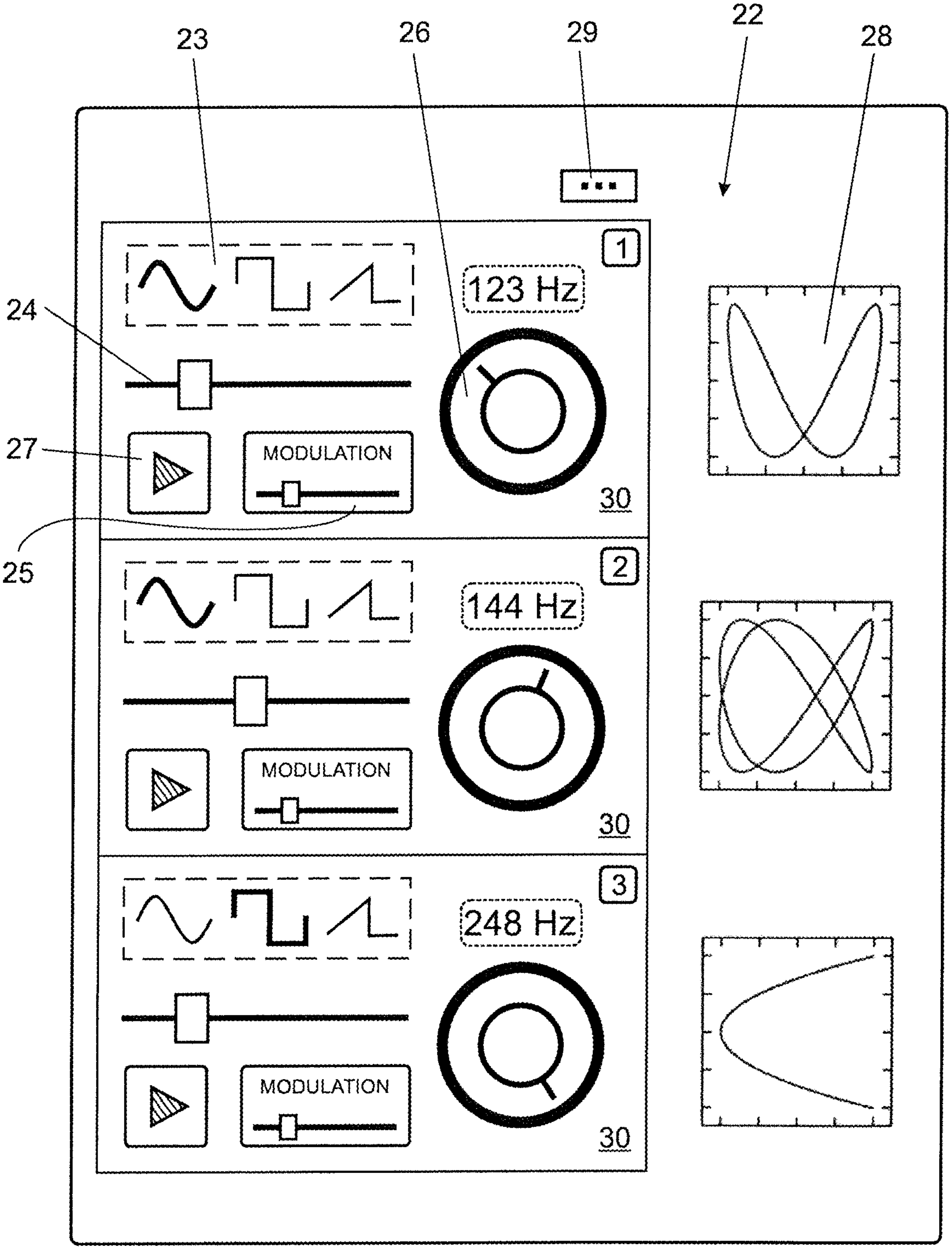

Here are shown:

FIG. 1 a schematic side view of a light pattern generator according to the invention according to a first embodiment;

FIG. 2 a schematic switching diagram of the light pattern generator shown in FIG. 1;

FIG. 3 a schematic perspective depiction of a light pattern generator according to the invention according to a second embodiment;

FIG. 4 a schematic perspective depiction of an illumination device according to the invention;

FIG. 5 a schematic view of a rear light of a vehicle according to the invention;

FIG. 6 examples for diverse Lissajou patterns;

FIG. 7 a flowchart of a method for controlling the light pattern generator according to the invention;

FIG. 8 a flowchart of a user selection for setting favorited node patterns to be displayed on an illumination device according to the invention; and FIG. 9 a schematic depiction of an input mask for setting the node patterns by a user.

DETAILED DESCRIPTION

As can be seen from FIG. 1, a light pattern generator 1 according to the invention comprises a laser generator 2 for generating a laser beam 3, a screen 4 that is at least partially transparent for the laser beam 3, at least one moveable mirror 5 arranged in the beam path of the laser beam 3 for deflecting the laser beam 3 in the direction of the screen 4, an actuator 6 for each mirror 5 in order to actuate it, and a control device 7 shown in FIG. 2 for actuating the respective actuator 6.

The control device 7 is set up to control the actuator 6 in such a way that the laser beam 3 is continuously guided along an inherently closed path on the screen 4 by means of the mirror 5, such that the laser beam 3 generates a node pattern 8 on the screen 4 as shown in FIG. 3 and in the further figures.

To do so, the control device 7 controls the actuator 6 by means of at least one control signal with a characteristic frequency. Control signals that differ by at least different characteristic frequencies are stored in the control device 7, for example stored on a physical storage medium, or generated by the control unit 7. A respective control signal for controlling the actuator 6 can be selected by the control device 7 depending on a selection variable. The selection variable can be communicated to the control device 7 externally or can also be determined by the control device 7 depending on different boundary conditions.

In the exemplary embodiment shown in FIG. 1, the actuator 6 is such an actuator 6 that can move the mirror 5 or a holding element 9, to which the mirror 5 is attached, translationally in the direction of a translation direction T. For example, the actuator 6 is a piezo element or a loudspeaker. Various components of the light pattern generator 1, such as the laser generator 2 and the actuator 6, can be fixed to a higher-level structure 13, for example a housing. Here, the screen 4 can be embedded in the housing or form part of it. In order to prevent the actuator 6 from causing the higher-level structure 13 to vibrate, the corresponding actuator 6 can be connected to the higher-level structure 13 via a passive or active damping element 12. The damping element 12 can be a rubber, elastomer or plastic foam damper, for example.

Typically, piezo elements and loudspeakers have a comparatively small stroke, wherein the holding element 9 is advantageously designed as a lever arm 10 in order to nevertheless enable a comparatively wide deflection of the laser beam 3. In FIG. 1, the lever arm 10 is illustrated in its rest position by a thick line. If the holding element 9 is caused to vibrate in the direction of translation T via the actuator 6, then the holding element 9 oscillates according to the oscillation modes resulting from its structure, wherein maximum deflection positions are indicated by dashed lines in FIG. 1.

In particular, the lever arm 10 or the holding element 9 is designed in such a way that when the mirror 5 is excited in only one direction, a vibration is performed in at least two directions.

The laser generator 2 is particularly preferably a UV laser or infrared laser, wherein the screen 4 is coated with a material capable of fluorescence on the side facing the direction of the mirror 5 and/or a corresponding material or material mixture is embedded in the screen 4. This reduces the risk of a person looking at the screen 4 being dazzled by the laser beam 3 while still enabling the generation of particularly aesthetic and bright node patterns 8.

Here, a viewing direction is indicated by an eye 16.

FIG. 2 shows the corresponding switching diagram of the light pattern generator 1 shown in FIG. 1. The actuator 6 is connected to an amplifier 18 via a line 17. The amplifier 18 is in turn connected via a line 17 to a DC voltage source such as a battery 19 for the power supply. This can also be an accumulator. The amplifier 18 receives an input signal via a control device 7, which is not shown in FIG. 1 for the sake of clarity.

With reference to FIG. 1, the control device 7 can be outside a cavity delimited by the higher-level structure 13. In particular, when the actuator 6 is a loudspeaker, the amplifier 18 can be connected to the control device 7 via a jack plug 20. When the light pattern generator 1 is designed with a different actuator 6, the amplifier 18 can also be dispensed with and the actuator 6 can be addressed directly by the control device 7.

The control device 7 can receive a selection variable 21 externally or also determine it itself depending on a measured variable. Depending on the selection variable 21, the control unit 7 selects a suitable control signal to control the actuator 6. As already mentioned, various signals each with characteristic frequencies are stored in the control device 7 or can be generated by it.

Furthermore, the laser generator 2 attached to a battery 19 via a line 17 is depicted.

FIG. 3 shows an alternative design of the light pattern generator 1 according to the invention. As the actuator 6, the light pattern generator 1 here comprises two electric drives that are able to set the two mirrors 5 shown in rotation. Here, the two mirrors 5 are arranged and aligned in relation to each other in such a way that the laser beam 3 is guided along a so-called Lissajou pattern 11 on the screen 4. To do so, the mirrors 5 are each connected to the respective electric engine in a tilted position. Thus, a center axis M of a respective mirror 5 is tilted by an angle α in relation to an axis of rotation R of the respective electric engine. This leads to the laser beam 3 being deflected by a slightly different angle when it hits the mirror 5, depending on the rotational position. Here, the respective mirrors 5 are aligned with each other in such a way that the laser beam 3 on the screen 4 is deflected by one of the mirrors in a first direction X and by a second of the mirrors 5 by a second direction Y orthogonal to the first direction X.

FIG. 4 shows the arrangement of two light pattern generators 1 according to the invention in an illumination device 14 according to the invention. Here, the two laser generators 2 can each generate a laser beam 3 of the same color or of different colors. The screen 4 shown in FIG. 4 can also be designed differently depending on a local position, for example in a different color and/or having a different material capable of fluorescence. For example, when the lighting device 14 is integrated into a vehicle 15 according to the invention and shown in FIG. 5, a first node pattern 8 can thus serve to form a rear light and a second node pattern 8 to form a direction indicator such as an indicator. During the generation of a node pattern 8, a respective laser beam 3 is here continuously guided along a respective closed path. However, the laser generator 2 can also be switched off and then reactivated. After reactivating the laser generator 2, a different node pattern 8 can then be generated by controlling the respective actuator 6 with a different control signal, for example, or the same as before.

FIG. 5 shows an exemplary outer view of the above-mentioned vehicle 15 according to the invention. The depiction shown in FIG. 5 clearly shows the use of the light pattern generator 1 according to the invention and, correspondingly, the illumination device 14 according to the invention for forming a vehicle rear light.

FIG. 6 shows by way of example various Lissajou patterns 11. Depending on the application and the desired pattern, these can then be displayed by means of an illumination device 14 according to the invention. Respective Lissajou patterns 11 or node patterns 8 can here appear static or also moving, i.e., animated.

FIG. 7 shows a flow chart of a method according to the invention for controlling the illumination device 14, i.e., corresponding to the light pattern generator(s) 1. In a method step 701, the control unit 7 is informed which selection variable 21 is to be output. Corresponding specifications can be communicated to the control device 7 externally, for example via a human-machine interface, or also depending on a vehicle parameter, for example individual selection variables 21 are determined for different forward travelling speed ranges of the vehicle 15.

In a method step 702, the control device 7 selects various control signals, each with different characteristic frequencies, depending on the selection variables 21 and transmits these to the actuator 6 for controlling in the method step 703.

In the method step 704, the mirror 5 is thereby moved or excited to oscillate.

In the method step 705, a corresponding node pattern 8 or Lissajou pattern 11 is projected on the screen 4.

FIG. 8 illustrates the procedure for setting the behavior of the control device 7 under which boundary conditions which selection variable 21 is to be selected.

In a method step 801, a user of the vehicle 15 uses a human-machine interface to set which control signal is to be output in the control device 7 for which boundary conditions. Here, the node patterns 8 that can be set in this way can be visually indicated to the user. According to a setting 802, the user selects a node pattern 8 that is permanently statically illuminated while the vehicle 15 is travelling. Here, the user themselves can specify which control signal is to be used for this purpose, i.e., the user can select or set the respective characteristic frequency of the control signal.

According to a setting 803, the vehicle 15 automatically selects the respective control signal depending on a set driving mode, such as a comfort, sport or dynamic driving mode.

According to a setting 804, the vehicle 15 selects the respective control signal itself depending on a distance measured from the rear to a different vehicle following the vehicle 15. The control device 7 thus changes the selection variable 21 when the distance between the vehicle 15 and the following different vehicle changes.

According to a setting 805, the adjustment of the selection variable 21 and correspondingly the control signals is carried out depending on the forward travelling speed of the vehicle 15. The speed ranges for which the same node pattern is displayed can be defined as desired, for example: standstill, scanning speed, walking speed, walking speed up to 30 km/h, 30 km/h to 50 km/h, 50 km/h to 100 km/h and greater than 100 km/h. There can also be a speed range for travelling in reverse.

FIG. 9 shows a schematic depiction of an input screen 22 for setting the node patterns 8 to be displayed by the user of the vehicle 15. The user can select the type of the control signal, for example a harmonic oscillation, a square wave pulse or a sawtooth pulse, via a selection field 23.

The user can set the amplitude of the control signal, i.e., the volume of an audio file, via a control 24.

The user can set various modulations for the control signal via a control 25.

The user can set the characteristic frequency via a control 26. A rasterization can be carried out according to any step width, for example in 1 Hz steps.

The user can output the control signal generated in this way acoustically and/or visually via a display region 28 via a selection field 27. The node pattern 8 that can be correspondingly displayed can also be visualized in the display region 28. Completed control signals can be saved and/or loaded via a selection field 29.

In the example in FIG. 9, setting fields 30 are depicted for three different control signals. The user can select that the corresponding control signals are to be merged to generate a common control signal. However, control can also be carried out with a single one of the control signals depicted.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A light pattern generator comprising:

a laser generator configured to generate a laser beam;

a screen that is at least partially transparent to the laser beam;

at least one moveable mirror arranged in a beam path of the laser beam and configured to deflect the laser beam in a direction of the screen;

an actuator configured to actuate the at least one moveable mirror; and a control device configured to control the actuator, wherein the control device, the actuator, and the at least one moveable mirror are configured to deflect the laser beam onto the screen in such a way that the laser beam is guided continuously along an inherently closed path on the screen, such that the laser beam generates a node pattern on the screen, wherein the screen here has a degree of transparency for light to pass through, such that the node pattern can be seen from a side of the screen opposite a side of the screen on which the laser beam strikes, wherein the control device is configured to control the actuator by at least one control signal with a characteristic frequency, wherein control signals of the at least one control signal and differing by at least different characteristic frequencies are held in the control device or are generatable by the control device, and a respective one of the control signals is selectable by the control device depending on a selection variable, wherein the actuator is configured to translationally move the at least one moveable mirror or a holding element supporting the at least one moveable mirror, and wherein the actuator is attached to a high-level structure via a damping element.

2. The light pattern generator of claim 1, wherein the actuator is a loudspeaker.

3. The light pattern generator of claim 1, wherein the at least one moveable mirror has a convex or concave curvature.

4. The light pattern generator of claim 1, wherein the at least one moveable mirror is attached to the actuator via the holding element, wherein the holding element is a lever arm extending orthogonally to a translation direction of the actuator away from the actuator.

5. The light pattern generator of claim 4, wherein the lever arm has different bending stiffnesses in a main direction of expansion of the lever arm and a direction transverse to the main direction of expansion of the lever arm.

6. The light pattern generator of claim 2, wherein the light pattern generator is part of an illumination device of a vehicle, wherein the illumination device is a rear light.

7. A light pattern generator comprising:

a laser generator configured to generate a laser beam;

a screen that is at least partially transparent to the laser beam;

at least one moveable mirror arranged in a beam path of the laser beam and configured to deflect the laser beam in a direction of the screen;

an actuator configured to actuate the at least one moveable mirror; and a control device configured to control the actuator, wherein the control device, the actuator, and the at least one moveable mirror are configured to deflect the laser beam onto the screen in such a way that the laser beam is guided continuously along an inherently closed path on the screen, such that the laser beam generates a node pattern on the screen, wherein the screen here has a degree of transparency for light to pass through, such that the node pattern can be seen from a side of the screen opposite a side of the screen on which the laser beam strikes, wherein the control device is configured to control the actuator by at least one control signal with a characteristic frequency, wherein control signals of the at least one control signal and differing by at least different characteristic frequencies are held in the control device or are generatable by the control device, and a respective one of the control signals is selectable by the control device depending on a selection variable, wherein the actuator is configured to rotationally move the at least one moveable mirror or a holding element supporting the at least one moveable mirror, wherein the at least one moveable mirror is attached to the actuator in such a way the at least one moveable mirror is inclined at an angle relative to an axis of rotation of the at least one moveable mirror, and wherein the at least one moveable mirror comprises at least two mirrors arranged in the beam path of the laser beam, wherein the at least two mirrors are arranged and aligned in relation to each other in such a way that the laser beam is moved on the screen along a Lissajou pattern when rotating the at least two mirrors.

8. The light pattern generator of claim 7, wherein the light pattern generator is part of an illumination device of a vehicle, wherein the illumination device is a rear light.

9. A method for controlling an illumination device of a vehicle, wherein the illumination device comprises a laser generator configured to generate a laser beam; a screen that is at least partially transparent to the laser beam; at least one moveable mirror arranged in a beam path of the laser beam and configured to deflect the laser beam in a direction of the screen; an actuator configured to actuate the at least one moveable mirror; and a control device configured to control the actuator, wherein the control device, the actuator, and the at least one moveable mirror are configured to deflect the laser beam onto the screen in such a way that the laser beam is guided continuously along an inherently closed path on the screen, such that the laser beam generates a node pattern on the screen, wherein the screen here has a degree of transparency for light to pass through, such that the node pattern can be seen from a side of the screen opposite a side of the screen on which the laser beam strikes, wherein the control device is configured to control the actuator by at least one control signal with a characteristic frequency, wherein control signals of the at least one control signal and differing by at least different characteristic frequencies are held in the control device or are generatable by the control device, and a respective one of the control signals is selectable by the control device depending on a selection variable, and wherein the actuator is configured to translationally move the at least one moveable mirror or a holding element supporting the at least one moveable mirror, the method comprising:

determining, by a computing unit of the vehicle, the selection variable depending on a vehicle parameter, a distance measured by the vehicle to a different vehicle following the vehicle, or an operating action input via a human-machine interface, wherein the at least one moveable mirror comprises at least two mirrors arranged in the beam path of the laser beam; and rotating, by the actuator, the at least two mirrors so that the at least two mirrors are arranged and aligned in relation to each other in such a way that the laser beam is moved on the screen along a Lissajou pattern.

10. The method of claim 9, wherein the control signal selected by the control device depending on the selection variable is visually or acoustically output in the vehicle, or the node pattern generated on the screen depending on the respective control signal is visually output in the vehicle.

11. The light pattern generator of claim 1, wherein the actuator is a piezo element.

12. The light pattern generator of claim 11, wherein the light pattern generator is part of an illumination device of a vehicle, wherein the illumination device is a rear light.

* * * * *